United States Patent Office 3,524,536
Patented Aug. 18, 1970

3,524,536
PACKAGED PRODUCTS UTILIZING A RESIN COMPOSITION AS A PACKAGING MATERIAL
Joseph Francis Terenzi, South Norwalk, and Mortimer Stafford Thompson, Woodbury, Conn., assignors to American Cyanamid Company, Stamford, Conn., a corporation of Maine
No Drawing. Filed Apr. 5, 1965, Ser. No. 445,780
The portion of the term of the patent subsequent to Nov. 21, 1984, has been disclaimed
Int. Cl. B65d 1/10; C08f 19/08, 19/18
U.S. Cl. 206—45.31
2 Claims

ABSTRACT OF THE DISCLOSURE

The invention relates to a method of storing and packaging products such as edible foods, pharmaceuticals, cosmetics and toiletries and the like which are sensitive to environmental conditions and to packages of such materials and containers therefor. The container is produced from a composition composed of a resinous terpolymer of methyl methacrylate, styrene, and acrylonitrile and a graft copolymer of a polybutadiene substrate having grafted thereon at least one, and preferably all, of the monomers in said resinous terpolymer.

---

The use of polymeric materials as packages, containers and the like for sale and storage of various products has been well known in the art. For example, polymers such as poly(ethylene), poly(vinyl chloride), poly(styrene) and the like have been utilized for such applications as bottles, thin-walled containers, package wrappings and various other shaped devices for use in the sale and storage of specific types of articles of manufacture. Each one of these known polymeric materials, however, has at least one inherent deficiency or drawback which prevents the usage thereof in many or all fields of application. For example, poly(ethylene) is not useful for the production of transparent containers because it itself is translucent. Therfore, poly(ethylene) cannot be used to store many foods which the buyer, of necessity, must see before the purchase. Additionally, poly(ethylene) containers are oxygen permeable and hence do not retain aroma and flavor to the fullest. They are, therefore, not sufficient for packaging many foods, such as coffee. Poly(styrene), on the other hand, is inapplicable for usage in the packaging of many foods because of the noxious flavor which it imparts to most foods and also because of it, too, is oxygen permeable and does not retain aroma. Poly(vinyl chloride), while being more favorable for food packaging in regard to its oxygen permeability and aroma retention, also may impart an undesirable taste to foods and, in addition, in so far as is known, in its transparent form, has not been accepted for commercial use by the Food and Drug Administration. Another type of composition which has been sometimes utilized in packaging is acrylonitrile-styrene copolymer blends with butadiene-styrene rubbers. These compositions, however, are also poor in many properties required of food containers and, in addition, are not transparent.

The above mentioned polymer compositions therefore, find use only in such applications wherein there is little or no problem in regard to the stability of the product to be contained therein, such as for example hardware, liquid detergents, suntan lotions, baby powder and the like.

We have now found that a series of alkyl methacrylic polymer-elastomer compositions may be utilized for storage, wrapping or packaging applications wherein other polymers are used, and, in addition, can be utilized as protective containers for many products which have not heretofore been satisfactorily packaged in plastics in, for example, the edible food field, the pharmaceutical field, the cosmetics and toiletry field as well as the field of household chemicals. That is to say, these alkyl methacrylic polymer-rubber compositions can be utilized in more widely divergent applications than other known polymeric compositions.

Although the compositions contemplated by the instant invention are known in the art, their usage for the above applications has heretofore not been recognized or believed possible. The plastics industry has manufactured these unique polymers for a number of years for such uses as automobile parts, shoe heels etc., but as far as we know, we are the first to contemplate their usage in the applications specified above and more fully described hereinbelow.

It is therefore an object of the present invention to provide a novel method of storing and packaging environmental sensitive products.

It is a further object of the present invention to provide a method of storing and packaging such environmental sensitive products as edible foods, pharmaceuticals, cosmetics and toiletries and the like so as to protect them from such environmental hazards as oxygen and water spoilage, flavor and aroma dissipation, taste transfer and the like.

It is also an object of the present invention to provide packages and containers useful for the storage of various environmental sensitive products.

These and other objects of the present invention will become more apparent to one skilled in the art upon reading the more detailed description of the present invention set forth hereinbelow.

As mentioned above, we have discovered a method of storing various environmental sensitive products. This method comprises filling, with one of said sensitive products, a container composed of a composition comprising a resinous polymer containing at least 50%, by weight, based on the weight of the polymer, of a compound having the formula (I)
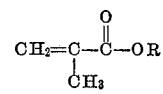

wherein R is hydrogen or an alkyl radical having from abut 1–6 carbon atoms, inclusive, the remaining being at least one unsaturated monomer copolymerizable therewith, modified with from about 5 to 50%, by weight, based on the weight of the total of the polymer and the rubbery material, of rubbery material which has been grafted by the polymerization, in the presence of said rubbery material, of at least 10%, by weight, based on the weight of the rubbery material, of at least one of the monomers present in said polymer, and closing said container to protect the contents thereof from the atmosphere.

These methacrylic polymer-rubber compositions are generally known in the art and are set forth more particularly in Canadian Pat. Nos. 628,148 and 643,619 as well as British Pat. No. 910,702, which patents are hereby incorporated herein by reference.

A preferred composition which has been found to give the most optimum properties is composed of a resinous terpolymer containing from about 50 to about 85% of methyl methacrylate, from about 5 to about 40% of styrene and from about 1 to about 30%, all by weight, of acrylonitrile modified with from about 5–25%, by weight of a poly(butadiene) which has been grafted by the polymerization, in the presence of said poly(butadiene), of at least 10% by weight, of at least one, and preferably all, of the monomers in said polymer. All the weight percentages have the same basis as indicated above.

The polymer-rubber compositions may be produced by any known method including those methods disclosed in the above mentioned Canadian and British patents. More preferable methods which may be used are set forth in at least one of the following copending U.S. patent applications:

(a) Ser. No. 195,433
(b) Ser. No. 195,410
(c) Ser. No. 195,434 and
(d) Ser. No. 195,576, all filed May 17, 1962 and all now abandonded except for Ser. No. 195,576, now U.S. Pat. No. 3,253,950, which applications are also hereby incorporated herein by reference. Ser. No. 195,434 was re-filed as Ser. No. 470,583, which in turn was refiled as Ser. No. 603,167, now U.S. Pat. No. 3,354,238.

Generally, such procedures constitute one of three related techniques. The most widely practiced method comprises forming the hard, resinous polymer by polymerizing the monomers, in their required concentrations, in the presence of a free-radical polymerization catalyst, at a temperature ranging from about 60° C. to about 230° C. Solvent, bulk or emulsion systems may be utilized. Catalysts such as benzoyl peroxide, di(t-butyl) peroxide, 2,5-dimethyl-2,5-di(t-butylperoxy) hexane and the like at concentrations ranging from 0.001% to 1.0%, by weight, based on the weight of the monomers, may be used.

The rubbery material may be grafted also utilizing any known method. Methods such as those set forth above may also be used to produce a grafted rubber. The two components, the polymer and the grafted rubber, may then be physically blended by use of, for example, a ball mill, a devolatilizer-extruder and the like to produce the final composition.

A second procedure comprises interpolymerizing all the ingredients, in one reaction vessel, i.e. a rubbery latex and the monomers to be used, under the same general conditions as mentioned above. In this manner, polymer per se is formed and the rubbery material is grafted. The final composition is thus produced in one step. Alternatively, rubber materials as solvent solutions, or in the monomers per se, may be used in place of the rubber latex. An additional method for producing the grafted rubbers which may be employed is disclosed, for example, in U.S. Pat. No. 2,755,270.

The compounds represented by Formula I, above, which may be utilized in the instant invention include methacrylic acid, methyl methacrylate, ethyl methacrylate, propyl methacrylate, iso-propyl methacrylate, n-butyl methacrylate, iso-butyl methacrylate, amyl methacrylate, hexyl methacrylate and the like. The molecular weight of the specific polymer employed is not critical, however, we have found that the higher molecular weight polymers give the more optimum properties, and for practical purposes, a molecular weight of at least about 50,000 should be employed.

The polymers which are modified with the grafted rubbery material, as mentioned above, must contain from 50% to 100%, by weight, based on the weight of the monomers, of a compound represented by Formula I, the remaining monomers, totaling 100% in combination with methacrylic compound, being selected from any one or more of various unsaturated monomers copolymerizable therewith.

Examples of monomers which can be copolymerized with the monomers represented by Formula I, and which can be polymerized either singly or in a plurality (two, three, four or any desired number) therewith, are such monomers as the unsaturated alcohol esters, more particularly the allyl, methallyl, crotyl, 1-chloroallyl, cinnamyl, vinyl, methvinyl, butenyl, etc., esters of saturated and unsaturated aliphatic and aromatic monobasic and polybasic acids such, for instance, as acetic, propionic, butyric, valeric, succinic, glutaric, adipic, suberic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclochexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones e.g., methyl vinyl ketone, methyl allyl ketone, etc.; ethylene; propylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide.

Among the comonomers which are preferred for use in carrying our invention into effect are, for example, the styrenes mentioned above and such compounds as acrylonitrile, and other compounds, e.g., the various substituted acrylonitriles (e.g. methacrylonitrile, ethacrylonitrile, phenylacrylonitrile, etc.), and the acrylates, such as methyl acrylate, ethyl acrylate, propyl acrylate, t-butyl acrylate, n-butyl acrylate, isobutyl acrylate, amyl acrylate, hexyl acrylate, and the like. Other monomers copolymerizable with the monomers of Formula I are given, for instance, in U.S. Pat. No. 2,601,572, dated June 24, 1952, where examples are given both by classes and species.

Of course, it is also possible, and oftimes preferable, to utilize copolymers produced from two or more of the monomers represented by Formula I, above.

Any rubbery material which may be grafted by polymerization of monomers in the presence thereof, may be used to produce the compositions contemplated for use herein. Examples of such rubbery materials include polybutadiene, natural or synthetic polyisoprene, polyisobutylene, poly(isobutylene/isoprene) copolymers, known rubbery butadiene copolymers made with such comonomers as methyl methacrylate, styrene, acrylonitrile in concentrations up to 75%, by weight, polyacrylate, i.e. ethyl, butyl, etc. polymers and copolymers which are rubbery, polyurethane, rubbery poly,alkylenes), i.e. poly(ethylene-propylene) copolymer rubbers and the like.

The compositions utilized herein may be blended with such ingredients as antioxidants, light stabilizers, heat stabilizers, lubricants, plasticizers, fillers, dyes and the like, without detracting from the unusually attractive properties of the resultant containers, packages etc., more fully discussed hereinbelow.

As mentioned above, the compositions may be formed into shaped articles by various known techniques such as blow-molding, compression molding, injection molding, vacuum forming, etc. to produce such articles as bottles, thin-walled containers, i.e. tubs, canisters, jars, food-holding trays, blister packages, pouches and the like.

The packages may be used to store both liquids, and, in pressurized containers, gases. They are tough, strong, flexible, shock resistant and usually transparent, and furthermore, have been accepted by the Food and Drug Administration for food packaging. They have a high torque retention for closures, can be hot filled to about 190° F. and are readily decorated and labeled without pretreating as required with poly(ethylene). Even more surprisingly, they have a very low taste transfer of plastic to the product packaged therein and vice versa, a low oxygen permeation rate, a low aroma and fragrance loss through permeation, excellent stress-cracking resistance, excellent static charge dissipation to prevent dust attraction, excellent resistance to fats and oils (animal, vegetable, mineral) and a high resistance to water permeation, both in liquid and vapor form.

Additional advantages reside in the fact that the containers may be closed to protect the contents thereof from the atmosphere by the use of screw closures, i.e. caps, pressure fittings, both metal and plastic or they may be sealed by the application of heat.

Furthermore, the compositions may be used as aerosol container for dispensing products, e.g. deodorants, air-fresheners, etc. by packaging these products, under pressure, with any gas which can be pressurized at room temperature e.g., butane, nitrogen, carbon dioxide, etc. Each of the above properties is generally recognized an essential requirement before a plastic may be used for most food packaging, and in view of the very nature of the article bengi packaged, failure of one property, in most cases, means failure of the container per se.

As mentioned above, many prior art polymers such as rubber modified poly(styrene) and copolymers of styrene and acrylonitrile fail commercially because they are not transparent, or impart taste, or are not a suitable oxygen barrier. Rubber-modified poly(vinyl chloride) fails because it is not easily manufactured, is not acceptable by the Food and Drug Administration in its transparent form, and must be modified with potentially extractable and toxic modifiers to retain the good properties it does have. Poly(carbonate) and phenoxy polymers are very prone to stress cracking and have therefore been rejected for most container uses.

Examples of types of products which may be packaged according to the instant inventive method include, among many others, such food products as vegetable oil, maple, chocolate and other syrups, mayonnaise, salad dressings, tomato ketchup, margarine, coffee, tea, condiments such as mustard, fruit juices, cookies, candies, peanut butter, honey, jelly and preserves, dairy products such as ice cream and butter, prepared foods such as gelatin and cole slaw and the like. Also various health and medicinal products such as mineral oil, baby oil, milk of magnesia, vitamin syrups and pills, antibiotics, aspirins and the like may be packaged according to our invention. Various cosmetics which are packaged according to our novel procedure include bath oil, shampoo, hair dressing, skin lotions and the like. Lighter fluid, fabric softeners, heavy duty household cleansers and the like are examples of household chemicals which may be utilized herein.

The packages may also be used as containers to protect hardware from rusting, electric components from oxidation and moisture loss or gain, silver from tarnishing and to maintain the stability of photographic developers and other materials sensitive to oxidation and reduction. It is to be understood that the above lists of uses and products which may be packaged are not all inclusive and many other products may be packaged and protected according to this invention without departing from the scope thereof.

By "environmental sensitive products" as used herein is meant those products which become spoiled, rendered useless, less attractive visually, tasteless and the like unless they are sealed or protected from the dangers or hazards of the environment in which they are stored or used. Generally this environment is the atmospheric conditions in the surrounding area but may also include other products, etc. with which the sensitive product may come in contact. The usual hazards include oxygen and/or nitrogen loss or gain, odors from within or without the package, aroma loss, liquid or gas loss or gain through the package and the like.

The following examples are set forth for purposes of illustration only and are not to be construed as limitations on the instant invention except as set forth in the appended claims. All parts and percentages are by weight unless otherwise indicated.

EXAMPLE 1

80 parts of a terpolymer containing 70 parts of methyl methacrylate, 10 parts of acrylonitrile and 20 parts of styrene are blended on a rubber mill, with 20 parts of poly(butadiene) which has been grafted by polymerization, in the presence thereof, of 7 parts of methyl methacrylate, 2 parts of styrene and 1 part of acrylonitrile, to prepare a molding composition. The composition is blow-molded at 450° F. and under a blow pressure of 90 p.s.i. into a bottle of standard 8 oz. capacity. The bottle is filled with vegetable oil and sealed with a screw closure. The bottle is transparent. Upon setting on a shelf for 24 months, the vegetable oil is found to have retained its flavor and aroma. The vegetable oil has not been degraded by oxygen or water and possesses no taste of any ingredient of the bottle whatsoever.

Following the procedure of Example 1, various containers and packages are produced from compositions containing various amounts of various polymers and grafted rubbers. The results of the storage of said containers and packages containing various products are set forth in Table 1 below.

TABLE 1

| Ex. | Overall composition | | Type of container | Product contained | Transparency |
|---|---|---|---|---|---|
| | Polymer | Rubber* | | | |
| 2 | MMA/STY/AN: 48.5/15.3/3/2.8. | BD/ST (10%) 23.4 | Jar | Mayonnaise | Yes (1 3 4). |
| 3 | 56/16/8 | PBD 20 (12%) | Heat-sealed bottle. | Corn oil | Yes (1 3) (3). |
| 4 | 67.5/18/9.5 | 5 (15%) ³ | Bottle | Salad dressing | Yes (1 3). |
| 5 | 63.8/17.2/9 | 10 (12%) ¹ | Bottle | Red wine | Yes (1 3). |
| 6 | MMA/αMS: 60/20 | 20 (21%) | Bottle | Maple syrup | Yes (1 3). |
| 7 | MMA/AN: 68/12 | BD/AN 20 (30%) ² | Tub | Butter | No (1 3). |
| 8 | PMMA | PBD 15 (17%) | Jar | Instant tea | No (1 3). |
| 9 | MMA/AN: 63/27 | 10 (10%) ² | Tin can lid | Coffee | No (1 3). |
| 10 | MMA/ST/AN: 58/3.5/18.5. | 20 (12%) | Jar | Jelly | Yes (1 3). |
| 11 | 49/14/7 | 30 (18%) | Jar | Peanut butter | Yes (1 3). |
| 12 | 56/16/8 | 20 (10%) | Bottle | Ketchup | Yes (1 3). |
| 13 | MMA/AN: 40/40 | 20 (26%) | Aerosol bottle | Cologne | Yes (1 3). |
| 14 | PMMA | EA/MMA/MAA: 92.5/5/2.5 (14%). | Bottle | Antibiotic syrup | No (1 3). |
| 15 | PMMA | Butyl (10%) ⁴ | Vacuum-formed tub | Margarine | No (1 3 4). |

See footnote at end of table.

TABLE I.—Continued

| Ex. | Potentially dangerous extractables in container | Taste transfer | Oxygen protection* | Flavor and aroma protection | Product compatibility | Ability to withstand 190° F. sterilization |
|---|---|---|---|---|---|---|
| 2 | No (2) | None (1) | V. Good (1 4) | Excellent (1 4) | V. good (1) | V. good (2 3). |
| 3 | No (2) | do | do | do | do | Do. |
| 4 | No (2) | do | do | do | do | Do. |
| 5 | No (2) | do | do | do | V. good | |
| 6 | No (2) | do | do | do | do | V. good (2 3). |
| 7 | No (2) | do | do | do | do | Do. |
| 8 | No (2) | do | do | do | do | |
| 8 | No (2) | do | do | do | do | |
| 9 | No (2) | do | do | do | do | V. good (2 3). |
| 10 | No (2) | do | do | do | do | Do. |
| 11 | No (2) | do | do | do | do | Do. |
| 12 | No (2) | do | do | do | do | Do. |
| 13 | No (2) | do | do | do | do | |
| 14 | No (2) | None (1) | do | do | do | |
| 15 | No (2) | do | do | do | V. good (1) | V. good (2 3). |

¹ Only STY grafted.
² Only MMA grafted.
³ Only AN grafted.
⁴ Butyl rubber.
(1) Rubber modified polystyrene fails.
(2) Rubber modified transparent polyvinyl chloride fails.
(3) Rubber modified opaque polyvinyl chloride fails.
(4) Polyethylene fails.
*ASTM Test No. D-1434-63; MMA—methyl methacrylate; STY—styrene; AN—acrylonitrile; BD—butadiene; PBD—polybutadiene; α-MS—α-methylstyrene; PMMA—poly(methyl methacrylate); EA—ethyl acrylate; and MAA—methacrylic acid.
**Grafted by polymerization, in presence thereof, of all the monomer in polymer modified therewith, in percent indicated, unless noted otherwise.
V—Very.

We claim:

1. A method of protecting and maintaining the package integrity of an environmental sensitive food, pharmaceutical, cosmetic, toiletry, alcohol-free household chemical or alcohol-free industrial chemical from the hazards of natural environment including oxygen and water spoilage, flavor and aroma dissipation and taste transfer which comprises filling, with one of said products, a transparent container produced from a composition characterized by a heat distortion temperature under load (264 p.s.i.) above about 75° C., a light transmission of at least about 85%, a yellowness index of 20% and below, an Izod impact strength of at least about 0.5 f.p.p.i. at 5% rubber and at least about 2.8 f.p.p.i. at 20% rubber and a high gloss and comprising a physical blend of (A) 70%–95% of a hard-resinous terpolymer comprising from about 67–72 parts of methyl methacrylate, 18–22 parts of styrene and 8–12 parts of acrylonitrile and (B) 5%–30% of polybutadiene grafted with from about 67–80 parts of methyl about 67–72 parts of methyl methacrylate, 18–22 parts of acrylonitrile, the ratio of polybutadiene to monomer in (B) ranging from about 2:1 to 3:1, respectively and closing said container from the atmosphere 2. A sealed, transparent package containing an environmental sensitive food, pharmaceutical, cosmetic, toiletry, alcohol-free household chemical or alcohol-free industrial chemical, said package being produced from a composition characterized by a heat distortion temperature under load (264 p.s.i.) above about 75° C., a light transmission of at least about 85%, a yellowness index of 20% and below, an Izod impact strength of at least about 0.5 f.p.p.i. at 5% rubber and at least about 2.8 f.p.p.i. at 20% rubber and a high gloss and comprising a physical blend of (A) 70%–95% of a hard, resinous terpolymer comprising from about 67–72 parts of methyl methacrylate, 18–22 parts of styrene and 8–12 parts of acrylonitrile and (B) 5%–30% of polybutadiene grafted with from about 67–80 parts of methyl methacrylate, 17–21 parts of styrene and 1–13 parts of acryonitrile, the ratio of polybutadiene to monomer in (B) ranging from about 2:1 to 3:1, respectively, and having the effect of protecting said product from the hazards of natural environment including oxygen and water spoilage, flavor and aroma dissipation, taste transfer and package incompatibility

References Cited

UNITED STATES PATENTS

| | | | |
|---|---|---|---|
| 3,337,650 | 8/1967 | Marcil | 260—880 |
| 3,354,238 | 11/1967 | Schmitt et al. | 260—876 |
| 3,400,175 | 9/1968 | Finestone et al. | 260—880 |
| 3,103,089 | 9/1963 | Allen | 53—37 |
| 3,157,519 | 11/1964 | Butt | 53—37 XR |
| 3,296,339 | 1/1967 | Feuer | 260—879 |

FOREIGN PATENTS 851,491   10/1960   Great Britain.

OTHER REFERENCES

Modern Plastics Encyclopedia, vol. 41, No. 1A, Sept. 1963, (1964 Issue) pp. 144–148, 181–187, 467 and 647. Copy in Gr. 140 Scient. Lib. Call No. TP986 A2M5.

MURRAY TILLMAN, Primary Examiner

C. J. SECCURO, Assistant Examiner

U.S. Cl. X.R.

53—35; 99—171; 260—876, 879, 880

UNITED STATES PATENT OFFICE
CERTIFICATE OF CORRECTION

Patent No. 3,524,536    Dated August 18, 1970

Inventor(s) Joseph Francis Terenzi; Mortimer Stafford Thompson

It is certified that error appears in the above-identified patent and that said Letters Patent are hereby corrected as shown below:

Column 1, line 49, after "because" delete the word "of".

Column 2, line 46, "abut" should be -- about -- .

Column 4, line 62, "poly,alkylenes)" should be -- poly(alkylenes) -- .

Column 5, line 23 "container" should be -- containers -- and line 30 "bengi" should be -- being -- .

Columns 5 and 6, Table I, the heading "Rubber*" should be -- Rubber** -- and under the heading "Transparency", Example 3, "Yes (1 3) (3)." should be -- Yes (1 3). -- .

Columns 7 and 8, Table I, cancel one Example 8.

Columns 7 and 8, Table I, under the heading "Taste Transfer", Example 13, "do" should be -- -------- --; under the heading "Product Compatibility", Example 11, "do" should be -- V. good (1) --; under the heading "Product Compatilibity", Examples 12, 13 and 14, "do" should be -- -------- --; under the heading "Ability to withstand 190°F. sterilization", Example 9, "V. good (2 3)." should be -- -------- -- and under the heading "Ability to withstand 190°F. sterilization", Example 10, "Do." should be -- V. good (2 3). -- .

UNITED STATES PATENT OFFICE
CERTIFICATE OF CORRECTION

PAGE- 2

Patent No. 3,524,536          Dated August 18, 1970

Inventor(s) Joseph Francis Terenzi; Mortimer Stafford Thompson

It is certified that error appears in the above-identified patent and that said Letters Patent are hereby corrected as shown below:

Claim 1, line 45, "about 67-72 parts of methyl methacrylate, 18-22" should read -- methacrylate, 17-21 parts of styrene and 1-13 -- .

SIGNED AND SEALED
NOV 10 1970

(SEAL)
Attest:

Edward M. Fletcher, Jr.
Attesting Officer

WILLIAM E. SCHUYLER, JR.
Commissioner of Patents